(12) United States Patent
Lin

(10) Patent No.: US 10,434,601 B2
(45) Date of Patent: Oct. 8, 2019

(54) WELDING PROCESS WITH AN ARC WELDER AND BEAM WELDER FOR A WELD TURBULATOR

(71) Applicant: GENERAL ELECTRIC COMPANY, Schenectady, NY (US)

(72) Inventor: Dechao Lin, Greer, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 214 days.

(21) Appl. No.: 15/631,131

(22) Filed: Jun. 23, 2017

(65) Prior Publication Data
US 2018/0369962 A1    Dec. 27, 2018

(51) Int. Cl.
| | | |
|---|---|---|
| *B23K 26/348* | (2014.01) | |
| *B23K 26/342* | (2014.01) | |
| *B23K 9/04* | (2006.01) | |
| *F01D 25/00* | (2006.01) | |
| *B23K 9/16* | (2006.01) | |
| *F01D 5/18* | (2006.01) | |
| *F01D 25/12* | (2006.01) | |

(52) U.S. Cl.
CPC ............ *B23K 26/348* (2015.10); *B23K 9/042* (2013.01); *B23K 9/16* (2013.01); *B23K 26/342* (2015.10); *F01D 5/187* (2013.01); *F01D 25/005* (2013.01); *F01D 25/12* (2013.01); *F05D 2230/234* (2013.01); *F05D 2230/235* (2013.01); *F05D 2230/31* (2013.01); *F05D 2260/2212* (2013.01); *F05D 2260/22141* (2013.01)

(58) Field of Classification Search
CPC .... B23K 9/042; B23K 26/348; B23K 26/342; B23K 15/0086
See application file for complete search history.

(56) References Cited

U.S. PATENT DOCUMENTS

| | | | | |
|---|---|---|---|---|
| 5,353,865 | A | * 10/1994 | Adiutori | F28F 13/02 165/109.1 |
| 2015/0165547 | A1 | * 6/2015 | Lin | F23R 3/44 219/121.38 |
| 2015/0328719 | A1 | * 11/2015 | Jarvis | B23K 1/0053 219/76.12 |
| 2017/0145586 | A1 | * 5/2017 | Xiao | C30B 13/24 |

FOREIGN PATENT DOCUMENTS

JP    2003311456 A  * 11/2003  ........... B23K 26/348

* cited by examiner

*Primary Examiner* — Geoffrey S Evans
(74) *Attorney, Agent, or Firm* — McNees Wallace & Nurick LLC

(57) ABSTRACT

A process of welding a weld turbulator on an article includes forming a weld pool on a surface of the article using an arc welder, directing at least one beam of at least one beam welder to at least one fusion edge of the weld pool, and translating the arc welder and the beam welder in a weld direction to shape the weld pool into the weld turbulator extending in the weld direction and having the fusion edge. A turbulator welding system includes an arc welder arranged and disposed to provide an electric arc on a surface of an article to form a weld pool and at least one beam welder arranged and disposed to provide at least one beam to at least one fusion edge of the weld pool. A component includes an article having a surface and a weld turbulator on the surface of the article.

9 Claims, 4 Drawing Sheets

US 10,434,601 B2

WELDING PROCESS WITH AN ARC WELDER AND BEAM WELDER FOR A WELD TURBULATOR

FIELD OF THE INVENTION

The present embodiments are directed to weld turbulator fabrication. More specifically, the present embodiments are directed to weld turbulator fabrications with multiple welders to achieve various turbulator profiles.

BACKGROUND OF THE INVENTION

By disrupting the flow of a fluid over a surface, generally by disrupting what would otherwise be laminar flow along the surface into turbulent flow, a turbulator increases the rate of heat exchange between the fluid and the surface. Turbulators are conventionally provided in turbine applications to aid in the cooling of turbine components during service.

A turbulator may be formed in any of a number of different ways, depending on the application, the materials involved, and the contour of the surface. Prefabrication of an article having a surface with one or more turbulators may provide the turbulators with a high degree of precision in their shape and location but may significantly increase the production cost and/or the production time of the article.

Formation of a weld turbulator on a surface by welding after fabrication of the surface may be less costly than prefabrication, but may require more time, allow for less precision in the shape and location of the turbulator, and may be difficult to form for certain surface contours. For example, for a weld turbulator formed by metal/inert-gas (MIG) welding, the height of a weld turbulator obtainable for a given weld turbulator width in a single pass formation of the weld turbulator may be insufficient for certain applications.

BRIEF DESCRIPTION OF THE INVENTION

In an embodiment, a process of welding a weld turbulator on an article includes forming a weld pool on a surface of the article using an arc welder, directing at least one beam of at least one beam welder to at least one fusion edge of the weld pool, and translating the arc welder and the at least one beam welder in a weld direction to shape the weld pool into the weld turbulator extending in the weld direction and having the at least one fusion edge shaped by the at least one beam welder.

In another embodiment, a turbulator welding system includes an arc welder arranged and disposed to provide an electric arc on a surface of an article to form a weld pool and at least one beam welder arranged and disposed to provide at least one beam to at least one fusion edge of the weld pool. The arc welder and the at least one beam welder are arranged and disposed to form a weld turbulator on the surface of the article from the weld pool, the weld turbulator having a turbulator width and a turbulator height, and the at least one fusion edge of the weld turbulator being uniform.

In yet another embodiment, a component includes an article having a surface and a weld turbulator on the surface of the article. The weld turbulator has a ridge shape with a first side having a first fusion edge, a second side opposite the first side having a second fusion edge, a turbulator height, and a turbulator width from the first fusion edge to the second fusion edge. At least one of the first fusion edge and the second fusion edge is uniform.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a weld turbulator fabrication with a turbulator welding system including an arc welder and at least one beam welder to produce a weld turbulator on the surface of an article.

Embodiments of the present disclosure, for example, in comparison to concepts failing to include one or more of the features disclosed herein, provide a cleaner weld fusion edge, provide a lower contact angle at a fusion edge, provide features of a narrower width and a taller height in a single welding pass, provide better heat transfer at a surface, or combinations thereof.

Arc welding, as used herein, refers to any process using an electrode to generate an electrical arc to heat a metallic metal for welding. The electrode may be a consumable electrode or a non-consumable electrode. Consumable electrode methods of arc welding include, but are not limited to, metal/inert-gas (MIG) welding, shielded metal arc welding, flux-cored arc welding, and submerged arc welding. Non-consumable methods of arc welding include, but are not limited to, tungsten/inert-gas (TIG) welding, plasma arc welding, atomic hydrogen welding, carbon arc welding, electrogas welding, and stud arc welding.

Beam welding, as used herein, refers to any process generating a beam to heat a metallic metal for welding. Beam welding processes include, but are not limited to, laser beam welding and electron beam welding.

Hastelloy X, as used herein, refers to an alloy including a composition, by weight, of between about 8% and about 10% molybdenum (Mo), between about 20.5% and about 23% chromium (Cr), between about 17% and about 20% iron (Fe), between about 0.2% and about 1% tungsten (W), between about 0.5% and about 2.5% cobalt (Co), between about 0.05% and about 0.15% carbon (C), up to about 1% silicon (Si), up to about 1% manganese (Mn), up to about 0.01% boron (B), up to about 0.04% phosphorus (P), up to about 0.03% sulfur (S), incidental impurities, and a balance of nickel (Ni).

Haynes 282, as used herein, refers to an alloy including a composition, by weight, of between about 18.5% and about 20.5% Cr, between about 9% and about 11% Co, between about 8% and about 9% Mo, between about 1.9% and about 2.3% titanium (Ti), between about 1.38% and about 1.65% aluminum (Al), up to about 1.5% Fe, up to about 0.3% Mn, up to about 0.15% Si, up to about 0.1% copper (Cu), between about 0.04% and about 0.08% C, up to about 0.02% zirconium (Zr), up to about 0.015% P, up to about 0.015% S, between about 0.003% and about 0.01% B, incidental impurities, and a balance of Ni.

Nimonic 263, as used herein, refers to an alloy including a composition, by weight, of between about 19% and about 21% Cr, between about 19% and about 21% Co, between about 5.6% and about 6.1% Mo, between about 1.9% and about 2.4% Ti, up to about 0.6% Al, up to about 0.6% Mn, up to about 0.4% Si, up to about 0.2% Cu, incidental impurities, and a balance of Ni.

Figure 1:
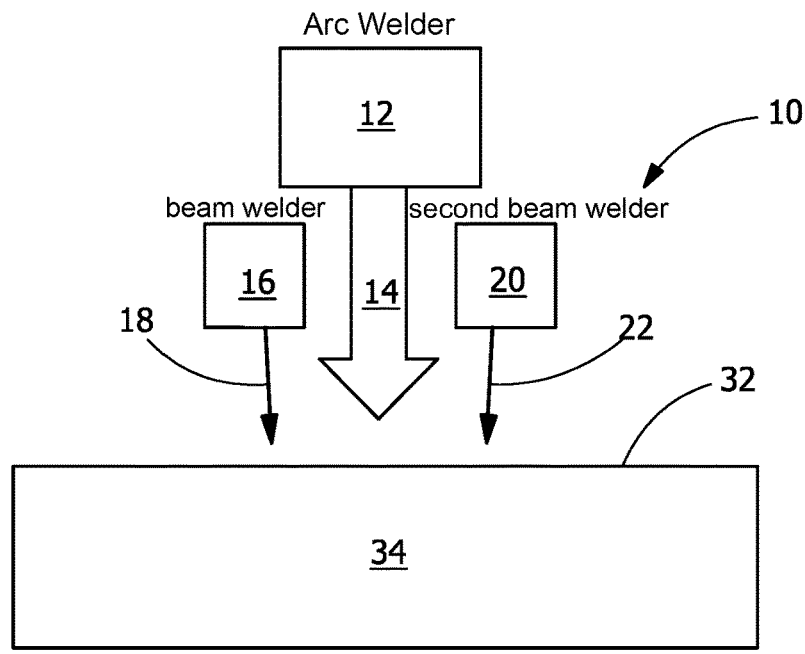
FIG. 1 is a schematic end view of a single beam turbulator welding system perpendicular to the weld direction in an embodiment of the present disclosure.
Figure 2:
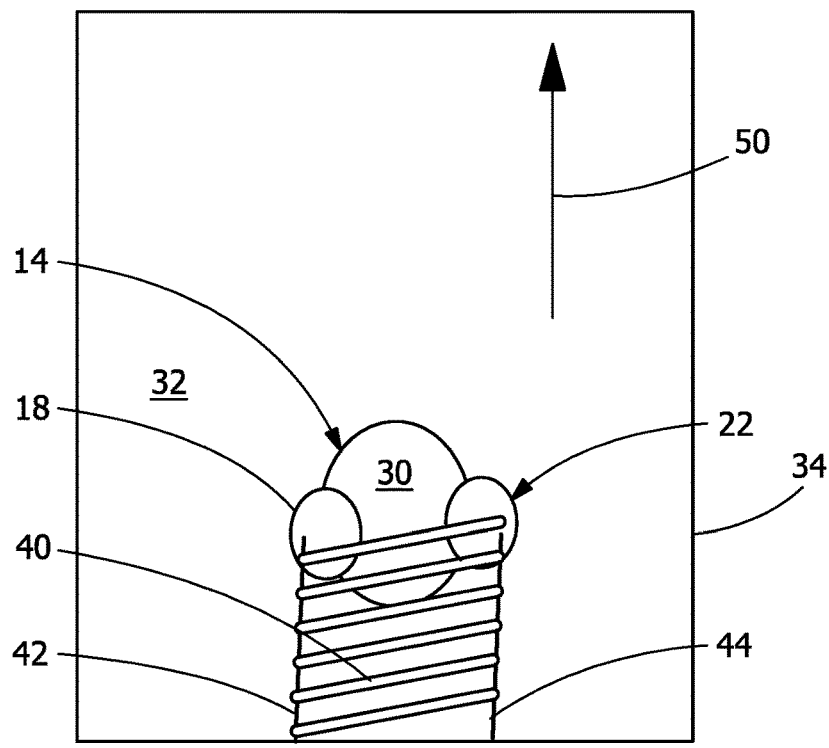
FIG. 2 is a schematic top view of the turbulator welding system of FIG. 1.

Referring to FIG. 1, the turbulator welding system 10 includes an arc welder 12 generating an electric arc 14, a first beam welder 16 generating a first beam 18, and a second beam welder 20 generating a second beam 22. The arc welder 12 is located to supply the electric arc 14 between the first beam 18 of the first beam welder 16 and the second beam 22 of the second beam welder 20. Referring to FIG. 1 and FIG. 2, the turbulator welding system 10 generates a weld pool 30 and shapes the weld pool 30 to form a weld turbulator 40 on the surface 32 of an article 34.

Referring to FIG. 2, the electric arc 14 forms the weld pool 30, while the first beam 18 shapes a first fusion edge 42 of the weld pool 30, and the second beam 22 shapes a second fusion edge 44 of the weld pool 30. The first beam 18 and the second beam 22 are placed substantially laterally to the weld pool 30 with respect to the weld direction 50. The arc welder 12, the first beam welder 16, and the second beam welder 20 generally move together in a weld direction 50 to form the weld turbulator 40 on the surface 32 of the article 34.

Figure 3:
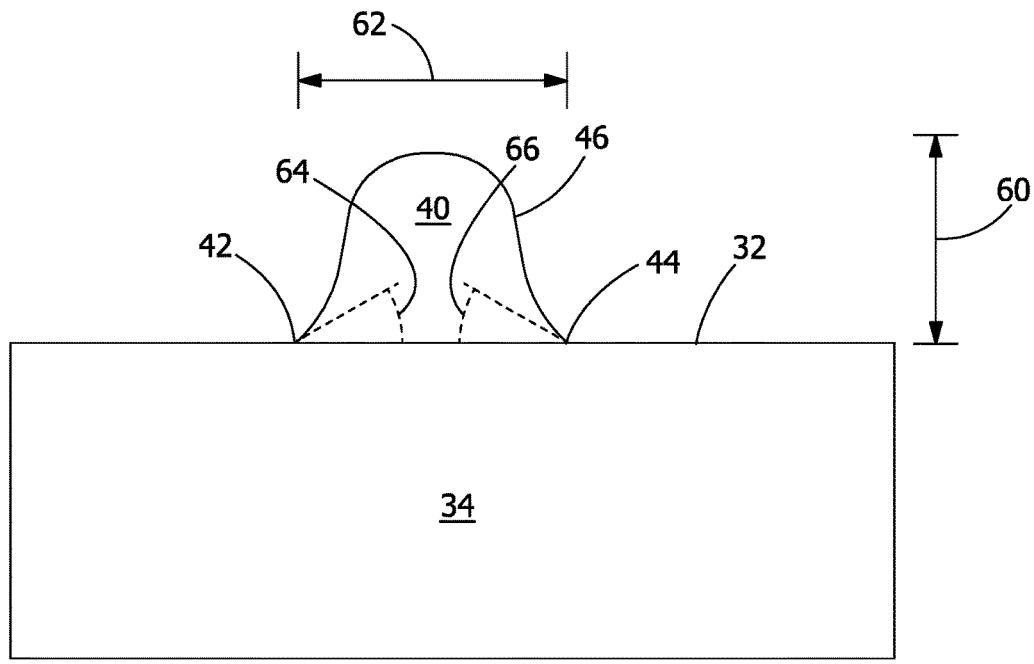
FIG. 3 is a schematic cross sectional view of an article having a weld turbulator in an embodiment of the present disclosure.

Referring to FIG. 3, the arrangement and movement of the arc welder 12, the first beam welder 16, and the second beam welder 20 is coordinated to produce a weld turbulator 40 on the surface 32 of the article 34 that, in addition to having a first fusion edge 42 and a second fusion edge 44 that are smooth, generally has a ridge shape 46 with a turbulator height 60, a turbulator width 62, a first turbulator contact angle 64 at the first fusion edge 42, and a second turbulator contact angle 66 at the second fusion edge 44.

Figure 4:
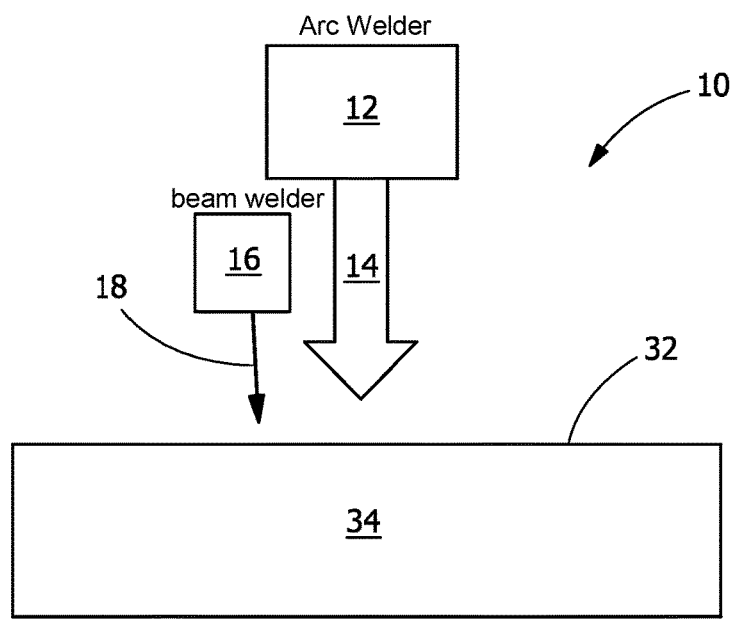
FIG. 4 is a schematic end view of a dual beam turbulator welding system perpendicular to the weld direction in an embodiment of the present disclosure.

Referring to FIG. 4, the turbulator welding system 10 includes an arc welder 12 generating an electric arc 14 and a first beam welder 16 generating a first beam 18. The electric arc 14 forms a weld pool 30, while the first beam 18 shapes a first fusion edge 42 of the weld pool 30. The arc welder 12 and the first beam welder 16 generally move together in a weld direction 50 to form the weld turbulator 40 on the surface 32 of the article 34.

Figure 5:
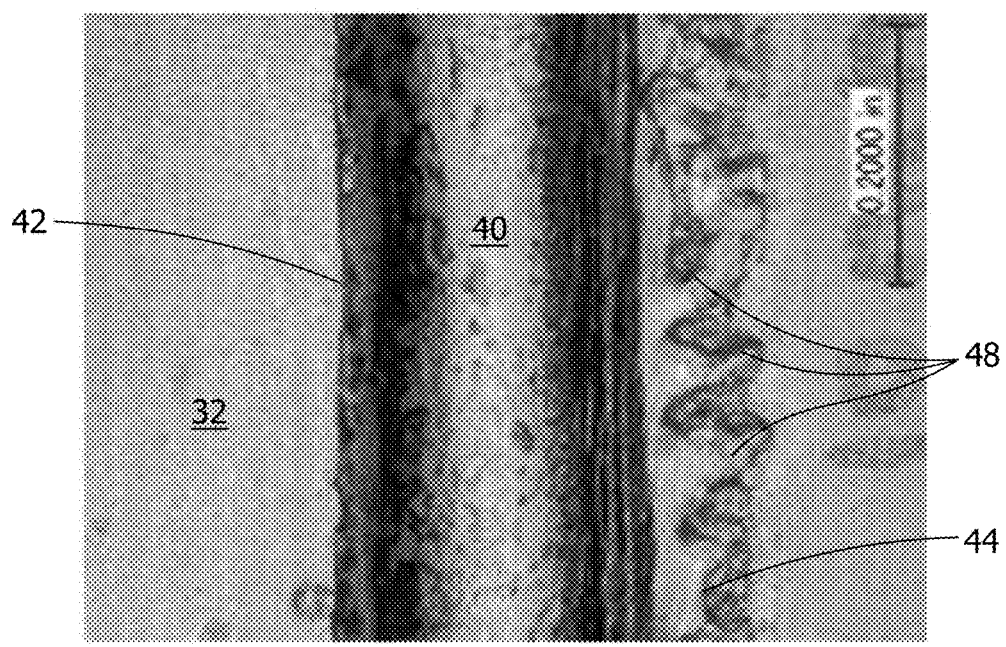
FIG. 5 is a top view of a weld turbulator formed on an article using a 200-kW laser.

FIG. 5 shows an image of a weld turbulator 40 formed using a turbulator welding system 10 including a MIG welder as the arc welder 12 and a laser welder with a 2-kW laser as the first beam welder 16 on the left edge of the weld turbulator 40 but no second beam welder 20 on the right edge of the weld turbulator 40. Without a second beam 22, the second fusion edge 44 is irregular, with weld toes 48 extending laterally from the weld turbulator 40. The first fusion edge 42, however, is uniform with a consistent weld width without any surface preparation as a result of use of the first beam welder 16 during formation of the weld turbulator 40.

Figure 6:
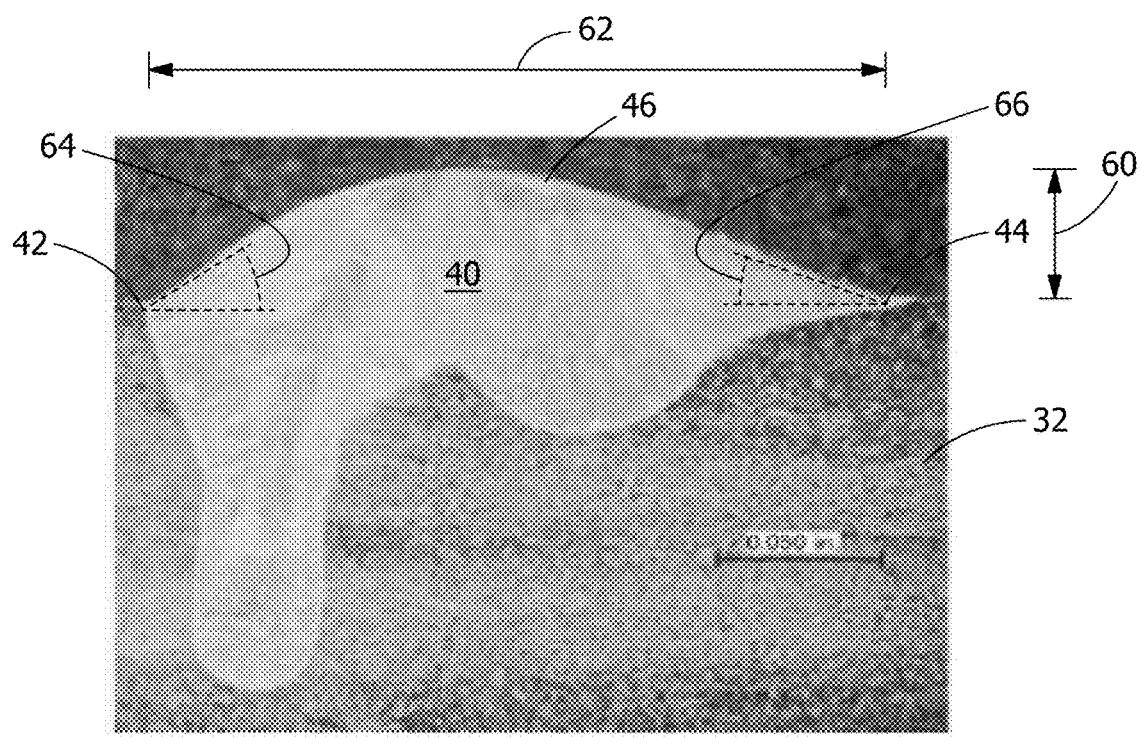
FIG. 6 is an end view of the weld turbulator and article of FIG. 5.

FIG. 6 shows an image of the weld turbulator 40 of FIG. 5 from an end of the weld turbulator 40. The weld turbulator 40 on the surface 32 of the article 34 has a first fusion edge 42, a second fusion edge 44, a ridge shape 46, a turbulator height 60, and a turbulator width 62. The first turbulator contact angle 64 at the first fusion edge 42 is greater than the second turbulator contact angle 66 at the second fusion edge 44.

Figure 7:
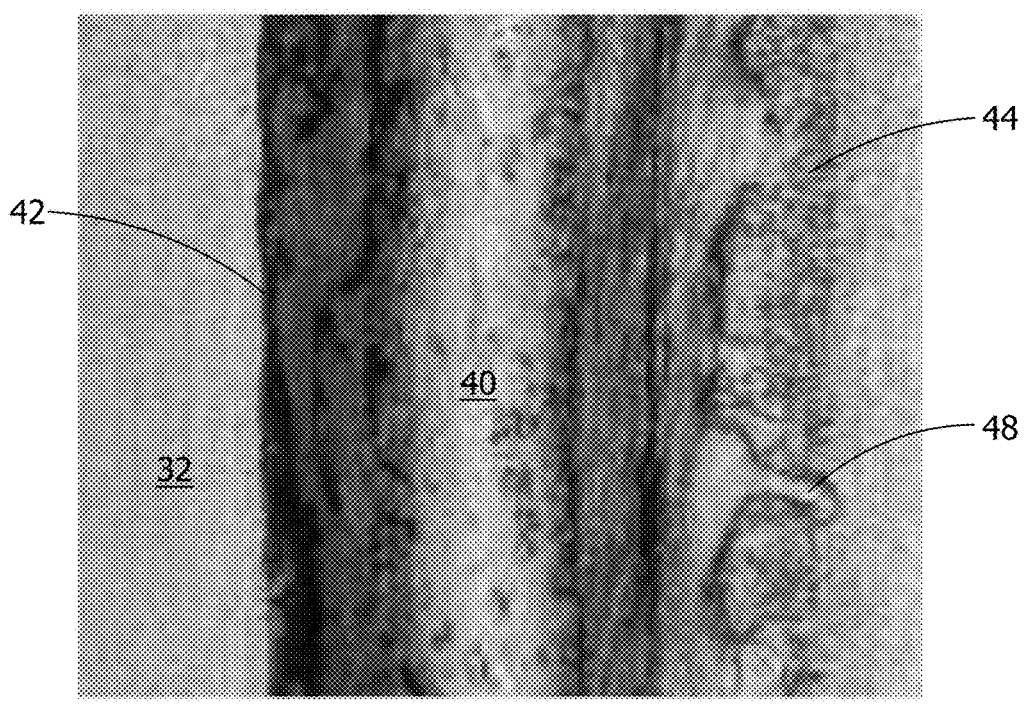
FIG. 7 is a top view of a weld turbulator formed on an article using a 100-kW laser.

FIG. 7 shows an image of a weld turbulator 40 formed using a turbulator welding system 10 including a MIG welder as the arc welder 12 and a laser welder with a 1-kW laser as the first beam welder 16 on the left edge of the weld turbulator 40 but no second beam welder 20 on the right edge of the weld turbulator 40. Without a second beam 22, the second fusion edge 44 is irregular, with weld toes 48 extending laterally from the weld turbulator 40. The first fusion edge 42, however, is uniform with a consistent weld width without any surface preparation as a result of use of the first beam welder 16 during formation of the weld turbulator 40.

Figure 8:
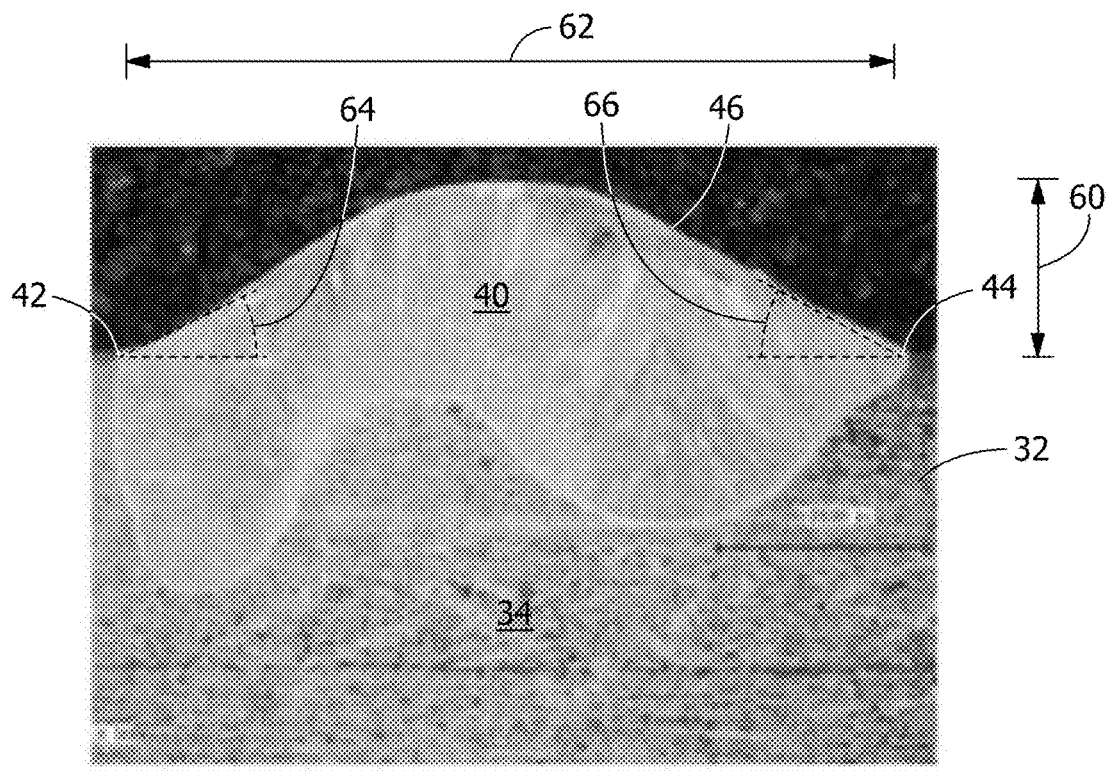
FIG. 8 is an end view of the weld turbulator and article of FIG. 7.

FIG. 8 shows an image of the weld turbulator 40 of FIG. 7 from an end of the weld turbulator 40. The weld turbulator 40 on the surface 32 of the article 34 has a first fusion edge 42, a second fusion edge 44, a ridge shape 46, a turbulator height 60, and a turbulator width 62. The first turbulator contact angle 64 at the first fusion edge 42 is similar to the second turbulator contact angle 66 at the second fusion edge 44 at this lower laser beam power. Without being bound by theory, it is believed that the first turbulator contact angle 64 varies with laser beam power and the second turbulator contact angle 66 varies with arc power. In embodiments where a high first turbulator contact angle 64 is not sufficiently important, a minimum laser beam power that is sufficient to assist and form a uniform first fusion edge 42 may be used. Alternatively, in embodiments where a greater first turbulator contact angle 64 is desired, a greater laser beam power may be used.

Conventional MIG welding creates shallow weld turbulator 40 profiles, for example, having a turbulator height 60 up to about 0.76 mm (about 0.030") with a turbulator width 62 from the first fusion edge 42 to the second fusion edge 44 of about 2.5 mm (about 0.10") or less, and surface preparations, such as, for example, removal of a surface oxide layer, removal of surface dirt, or machining of the surface 32, prior to formation of the weld turbulator 40 may be needed to achieve such dimensions. A taller weld turbulator 40 may be achieved by using more weld material but at the cost of a wider weld turbulator 40. Conventional MIG welding is not suitable, however, to achieve a taller and narrower weld turbulator 40. Decreasing the turbulator width 62 and increasing the first turbulator contact angle 64 and second turbulator contact angle 66 are challenges, at least in part, due to the metal transfer natures with MIG welding.

In some embodiments, a first beam 18 and a second beam 22 hitting on either side of the weld pool 30 assist the weld fusion and create a first fusion edge 42 and a second fusion edge 44 that are smooth, have no weld toes 48, and have a first turbulator contact angle 64 and a second turbulator contact angle 66 that meet mechanical design specifications for a weld turbulator 40 with higher low-cycle fatigue (LCF). In addition, the two lateral beams, first beam 18 and second beam 22, may be used to control the turbulator width 62 of the weld turbulator 40 and, indirectly, the turbulator height 60.

In some embodiments, a smooth first fusion edge 42 and/or a higher first turbulator contact angle 64 are desirable on only one of the first fusion edge 42 and the second fusion edge 44 of the weld turbulator 40. In some embodiments, only the upstream side of the weld turbulator 40 has a first fusion edge 42 that is smooth and has a higher first turbulator contact angle 64 by formation using a first beam 18, whereas the downstream side is formed without a second beam 22 such that the second fusion edge 44 on the downstream side may be irregular, may have weld toes 48, and/or may have a lower turbulator contact angle 66, where upstream and downstream are with respect to the direction of fluid flow over the surface 32 during service. In such embodiments, a single first beam 18 hitting laterally on one side of the weld pool 30 assists the weld fusion and creates a first fusion edge 42 that is smooth, has no weld toes 48, and has a first turbulator contact angle 64 that meets mechanical design specifications for a weld turbulator 40 with higher low-cycle fatigue (LCF). In addition, the lateral first beam 18 may be used to control the turbulator width 62 of the weld turbulator 40 and, indirectly, the turbulator height 60.

In some embodiments, the article 34 is a turbine component. In some embodiments, the article 34 is a turbine combustion component. In some embodiments, the material of the article 34 is a superalloy. In some embodiments, the superalloy is an iron-based superalloy, a cobalt-based superalloy, or a nickel-based superalloy. In some embodiments, the material of the article is Hastelloy X, Haynes 282, or Nimonic 263.

When the article 34 is a turbine combustion component, attaching the weld turbulator 40 to the article 34 provides better cooling and better reinforcement for the component body in a harsh turbine environment with a high temperature and mechanical vibration. The process saves fabrication time and increases productivity.

In some embodiments, the turbulator welding system 10 is fully automated. Parameters, such as the distance between the arc welder 12 and the first beam welder 16, the distance between the arc welder 12 and the second beam welder 20, the distance between the first beam welder 16 and the second beam welder 20, the feed rate of the weld material, and the translation rate of the arc welder 12, first beam welder 16, and second beam welder 20 in the weld direction 50, may be set or adjusted depending on the desired turbulator width 62, turbulator height 60, first turbulator contact angle 64, and second turbulator contact angle 66 of the weld turbulator 40.

In some embodiments, one or more of the arc welder 12, the first beam welder 16, and the second beam welder 20 may be manually controlled.

In some embodiments, the weld turbulator 40 has a turbulator height 60 from the surface 32 of the article 34 to the highest point of the weld turbulator 40 of at least about 2.3 mm (about 0.09"), alternatively at least about 1.8 mm (about 0.07"), alternatively at least about 2.0 mm (about 0.08"), alternatively at least about 2.5 mm (about 0.10"), alternatively in the range of about 2.0 mm (about 0.08") to about 2.5 mm (about 0.10"), or any value, range, or subrange therebetween, and a turbulator width 62 from the first fusion edge 42 to the second fusion edge 44 of no more than about 0.76 mm (about 0.030"), alternatively no more than about 0.64 mm (about 0.025"), alternatively no more than about 0.89 mm (about 0.035"), alternatively no more than about 1.02 mm (about 0.040"), alternatively in the range of about 0.64 mm (about 0.025") to about 1.02 mm (about 0.040"), or any value, range, or subrange therebetween.

In some embodiments, the weld turbulator 40 has at least one of the first fusion edge 42 and the second fusion edge 44 having a first turbulator contact angle 64 and/or a second turbulator contact angle 66, respectively, each of at least about 35 degrees, alternatively at least about 30 degrees, alternatively at least about 40 degrees, alternatively in the range of about 30 degrees to about 40 degrees, or any value, range, or subrange therebetween.

In some embodiments, the weld turbulator 40 is formed in a single pass of the turbulator welding system 10 in the weld direction 50.

In some embodiments, the dimensions of the weld turbulator 40 are achieved with no machining to change the ridge shape 46 of the weld turbulator 40 after its initial formation by the welding process.

Although the formed structure has been described herein as a weld turbulator 40, the formed structure may have any application where a buildup weld structure having a uniform edge, a high contact angle, and/or the combination of height and width achievable by the welding process is desirable.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process of welding a weld turbulator on an article, the process comprising:
    forming a weld pool on a surface of the article using an arc welder;
    directing at least one beam of at least one beam welder to at least one fusion edge of the weld pool; and
    translating the arc welder and the at least one beam welder in a weld direction to shape the weld pool into the weld turbulator extending in the weld direction and having the at least one fusion edge shaped by the at least one beam welder.

2. The process of claim 1, wherein the translating occurs such that the at least one fusion edge is uniform.

3. The process of claim 1, wherein the translating occurs such that the at least one fusion edge is free of weld toes.

4. The process of claim 1, wherein the weld turbulator is welded without any surface preparation of the surface of the article prior to forming the weld pool.

5. The process of claim 1, wherein the weld turbulator is welded in a single pass of the arc welder and the at least one beam welder.

6. The process of claim 1, wherein the at least one beam welder has a power in the range of about 1 kW to about 2 kW.

7. The process of claim 1, wherein the arc welder is a metal inert gas (MIG) welder.

8. The process of claim 1, wherein the at least one beam welder is at least one laser beam welder.

9. The process of claim 1, wherein:
the at least one beam of at least one beam welder comprises a first beam of a first beam welder and a second beam of a second beam welder and the at least one fusion edge of the weld pool comprises a first fusion edge and a second fusion edge opposite the first fusion edge;
the directing comprises directing the first beam of the first beam welder to the first fusion edge of the weld pool and directing the second beam of the second beam welder to the second fusion edge of the weld pool; and
the translating comprises translating the arc welder, the first beam welder, and the second beam welder.

* * * * *